(12) United States Patent
Pracas

(10) Patent No.: US 6,238,262 B1
(45) Date of Patent: May 29, 2001

(54) ELECTRONIC INTERACTIVE PUPPET

(75) Inventor: Victor Manuel Pracas, Waroona Wa (AU)

(73) Assignee: Technovation Australia Pty LTD, Safety Bay (AU)

( * ) Notice: Subject to any disclaimer, the term of this patent is extended or adjusted under 35 U.S.C. 154(b) by 0 days.

(21) Appl. No.: 09/238,785

(22) Filed: Jan. 27, 1999

(30) Foreign Application Priority Data

Feb. 6, 1998 (AU) .................................................. PP 1702

(51) Int. Cl.[7] .......................................................... A63H 3/28
(52) U.S. Cl. ............................................. 446/301; 434/308
(58) Field of Search ..................................... 446/297–303, 446/337; 434/307, 308; 369/83, 69

(56) References Cited

U.S. PATENT DOCUMENTS

| 4,729,563 | * | 3/1988 | Yokoi . | |
|---|---|---|---|---|
| 4,840,602 | * | 6/1989 | Rose | 446/175 |
| 4,846,693 | * | 7/1989 | Baer | 434/308 |
| 4,923,428 | | 5/1990 | Curran . | |
| 5,191,615 | * | 3/1993 | Aldava et al. | 381/3 |
| 5,746,602 | * | 5/1998 | Kikinis | 434/169 |

FOREIGN PATENT DOCUMENTS

| 0 248 115 | 12/1987 | (EP) . |
|---|---|---|
| WO 91/10490 | 7/1991 | (WO) . |
| WO 91/10491 | 7/1991 | (WO) . |
| WO 94/08677 | 4/1994 | (WO) . |
| WO 96/19274 | 6/1996 | (WO) . |
| WO 99/00979 | 1/1999 | (WO) . |

* cited by examiner

Primary Examiner—Jacob K. Ackun, Jr.
Assistant Examiner—Jeffrey D. Carlson
(74) Attorney, Agent, or Firm—Larson & Taylor, PLC

(57) ABSTRACT

An electronic interactive puppet 10 has a body 12 with a head 14 that is capable of moving from left to right. The puppet's head 14 also has a moveable mouth 16, moveable eyes 18 and moveable eyebrows 20 to give added expression to the puppet's facial features. An actuating means 22 is provided for moving the puppet's head 14, mouth 16, eyes 18 and eyebrows 20 responsive to an actuating signal. The puppet 10 also includes a sound reproducing means 24 housed within the body 12 for reproducing pre-recorded sounds such as dialogue for the puppet. An electronic control means 26 is operatively connected to the actuating means 22 and sound reproducing means 24 of the puppet. The sound reproducing means 24 and actuating means 22 can be activated in synchronism with a sound track of a video program so that the puppet 10 appears to interact audibly and animatedly with the video program. The puppet 10 can be used with any conventional video program, and does not require a special video recording.

11 Claims, 5 Drawing Sheets

ELECTRONIC INTERACTIVE PUPPET

FIELD OF THE INVENTION

The present invention relates to an electronic interactive puppet capable of moving and reproducing sounds that are synchronised with a soundtrack of a video program so that the puppet appears to interact with the video program.

BACKGROUND TO THE INVENTION

An electronic "stuffed toy" is sold by Microsoft under the trade mark ActiMates™ which appears to interact with a video program viewed on a television screen or video monitor. In the ActiMates™ toy a radio receiver picks up a radio signal transmitted from a special transmitter connected to the television or video cassette recorder (VCR). The VCR must be provided with a special ActiMates™ compatible video in which the sound track has been modified for transmission to the "stuffed toy". During playback of the video the special transmitter converts the sound track of the video recording to a radio signal for transmission to the toy. The ActiMates™ toy converts the radio signal to an audio signal that is fed to a loudspeaker in the stuffed toy. In this way, the toy appears to interact with the video program. However, in reality, the toy is simply reproducing the dialogue from the sound track recorded on the video tape.

There are several disadvantages with this known puppet. Firstly, it will only work with an ActiMates™ compatible video recording on which the sound track has been suitably modified for the ActiMates™ toy. Secondly, in some jurisdictions, particularly in Europe, there are very strict regulations on the permissibility of transmitting radio signals though air (due to interference with other RF devices) and it is unlikely that the special transmitter provided in the ActiMates™ kit would comply with these regulations. Thirdly, the ActiMates™ toy does not actually interact with the video program. Indeed, other sounds recorded on the sound track of the video recording can be heard emanating from the stuffed toy which tend to spoil the effect.

SUMMARY OF THE PRESENT INVENTION

The present invention was developed with a view to providing an electronic interactive puppet capable of moving and reproducing sounds in synchronism with a sound track of any conventional video program. Throughout the following description the term "video program" will be used with particular reference to a video program reproduced on a video player such as a VCR or DVD player. However, it is to be understood that the term "video program" is also intended to encompass a television program which is transmitted through air or cable and viewed on a conventional television receiver. The term also encompasses a video clip or multimedia sequence recorded on CD ROM, a hard disk or other memory device in a personal computer.

According to one aspect of the present invention there is provided an electronic interactive puppet capable of moving and reproducing sounds that are synchronised with a soundtrack of a conventional video program, the puppet comprising:

a body having one or more moving parts associated therewith;

an actuating means provided within said body for moving said one or more parts responsive to an actuating signal;

sound reproducing means housed within said body for reproducing pre-recorded sounds; and, an electronic control means operatively connected to said actuating means and sound reproducing means, and including a detecting means for detecting a predetermined point in said video program and for activating said sound reproducing means and actuating means responsive to said detection whereby, in use, the puppet appears to audibly and animatedly interact with the video program.

Typically said sound reproducing means includes an audio recording medium reproducing means and an audio transducer, and wherein said pre-recorded sounds are recorded in a recording track of said audio recording medium inserted for playback in said audio recording medium reproducing means. Preferably said actuating signal is recorded in another track of said audio recording medium. Typically said audio recording medium is magnetic recording medium. Preferably said magnetic recording medium is an audio cassette tape. Alternatively said audio recording medium is an optical disc. Preferably the puppet is in the form of a human-like creature and said body has a head capable of moving. Typically the head has a moveable mouth and moveable eyes. Preferably the head also has moveable eyebrows.

Preferably said actuating means comprises a first electric motor for turning the puppet's head sideways. Preferably said actuating means further comprises a second electric motor for moving the puppet's mouth open and closed.

According to another aspect of the present invention there is provided an audio recording medium for an electronic interactive puppet capable of moving and reproducing sounds that are synchronised with a soundtrack of a conventional video program, said puppet having a body with one or more moving parts associated therewith, an actuating means for moving said one or more parts responsive to an actuating signal, and sound reproducing means for reproducing pre-recorded sounds, the audio recording medium including:

a first recording track in which is recorded said pre-recorded sounds for reproduction on said sound reproducing means; and, a second recording track in which is recorded said actuating signal for activating said actuating means whereby, in use, when said audio recording medium is played back by said sound reproducing means the puppet appears to audibly and animatedly interact with the video program.

Preferably said actuating signal is recorded in the form of an audio signal having a predetermined sequence of sounds adapted to control said actuating means to move said one or more parts according to a predetermined movement sequence.

Preferably said audio recording medium is magnetic recording medium and said first and second recording tracks correspond to the left and right channels of a stereo audio recording. Most preferably said magnetic recording medium is an audio cassette tape.

BRIEF DESCRIPTION OF THE DRAWINGS

In order to facilitate a more comprehensive understanding of the nature of the invention, a preferred embodiment of the electronic interactive puppet will now be described in detail, by way of example only, with reference to the accompanying drawings, in which:

FIG. 7 illustrates a first electric motor and transmission for the puppet of FIG. 1;

DETAILED DESCRIPTION OF PREFERRED EMBODIMENT

Figure 1:
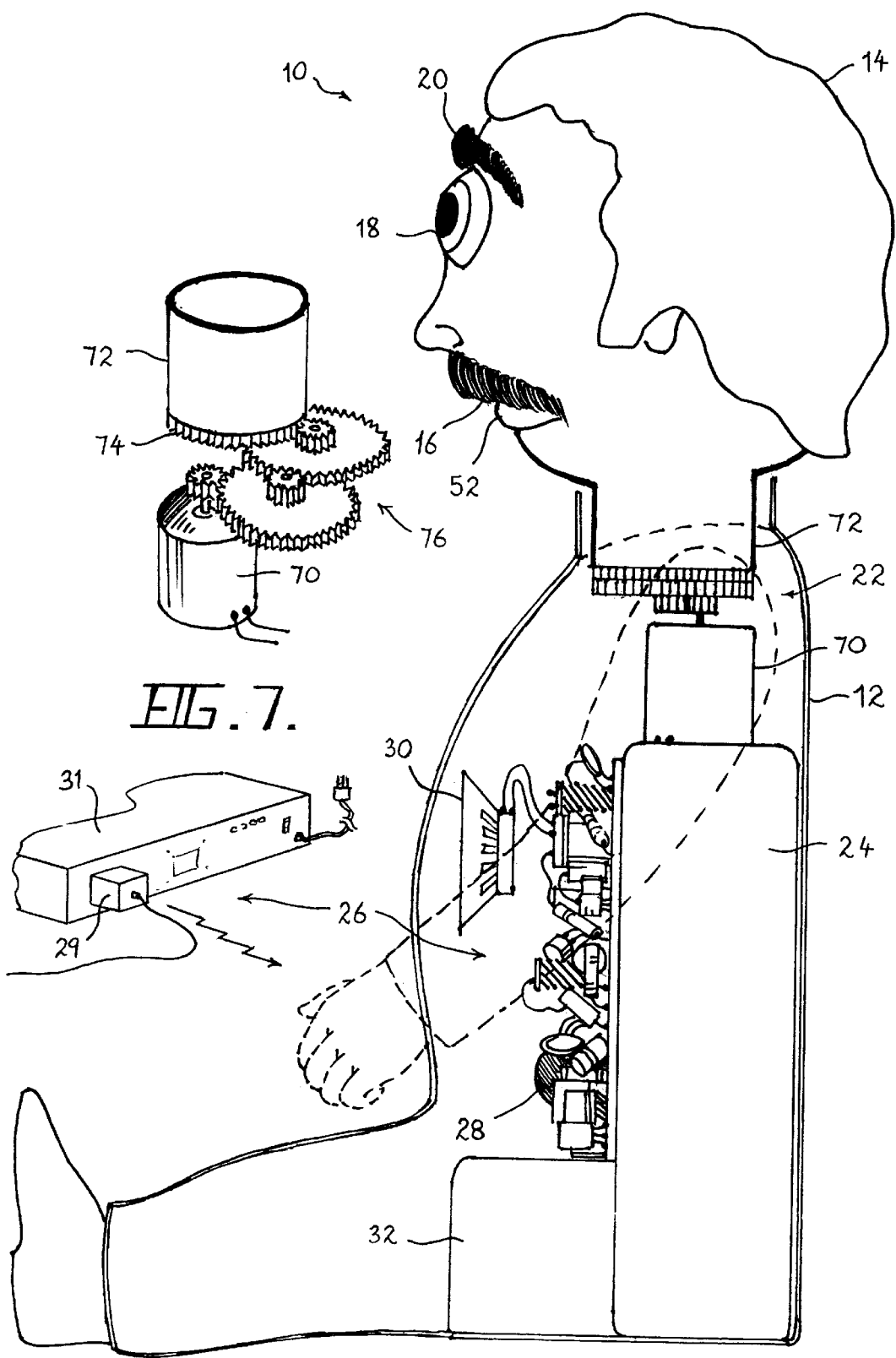
FIG. 1 is a partial section view of a preferred embodiment of an electronic interactive puppet in accordance with the present invention.

A preferred embodiment of the electronic interactive puppet 10 as shown in FIG. 1, is in the form of a human being, in this case a male Latin American who goes by the name "Gonzales". Gonzales has a body 12 with a head 14 that is capable of moving. The puppet's head 14 also has a moveable mouth 16 and moveable eyes 18. Being Latin American, Gonzales has heavy eyebrows 20 which are also moveable to give added expression to the puppet's facial features.

The puppet 10 further comprises an actuating means 22 (see also FIGS. 2 to 4 and 6) for moving the puppet's head 14, mouth 16, eyes 18 and eyebrows 20 responsive to an actuating signal. Actuating means 22 will be described in further detail below. The puppet 10 also includes a sound reproducing means 24 housed within the body 12 for reproducing pre-recorded sounds such as dialogue for the puppet. An electronic control means 26 is operatively connected to the actuating means 22 and sound reproducing means 24 of the puppet. The electronic control means 26 includes a detecting means for detecting a predetermined point in a soundtrack of a video program. Electronic control means 26 activates the sound reproducing means 24 and actuating means 22 responsive to the detection of said predetermined point in the soundtrack. Hence, the sound reproducing means 24 and actuating means 22 can be activated in synchronism with the soundtrack of the video program so that the puppet appears to interact audibly and animatedly with the video program.

In this embodiment of the puppet 10, the sound reproducing means 24 comprises a conventional stereo audio cassette tape player for reproducing audio signals recorded on a conventional stereo audio cassette tape. The pre-recorded sounds reproduced from the audio cassette tape are played back through loud speaker 30 housed within the body 12 of the puppet. The prerecorded sounds include exclamations, words and dialogue spoken with an accent corresponding to Gonzales' Latin American origins. The sound reproducing means 24 may include any suitable audio recording medium reproducing means, such as a CD player for reproducing an optical compact disc. Indeed it may not be essential that the audio recording medium reproducing means be housed within the body 12 of the puppet. Hence, for example, it may be more convenient to employ a CD ROM player within a personal computer which is connected to the sound reproducing means 24 of the puppet by a cable or other transmission medium.

In the present embodiment, the audio cassette tape includes a first recording track in which is recorded an audio signal for reproducing the pre-recorded sounds that Gonzales makes, and a second recording track in which is recorded the actuating signal for activating the actuating means 22 which controls the movement of the moveable parts of the puppet 10. The first and second recording tracks correspond to the left and right channels of a conventional stereo audio recording. However, in this case only one of the channels is used for reproducing prerecorded sounds that will be heard external to the puppet. The other channel is used for recording the actuating signal which may also be an audio signal, for example a sequence of audio tones, which are employed by the electronic control means 26 for activating the actuating means 22.

Electronic control means 26 includes a micro-processor based controller which includes an analogue to digital converter for converting the sequence of audio tones into a digital format. Different tones are employed to control each of the movements of the puppet's head, mouth and eyebrows. These audio tones are recorded in synchronism with the audio sound track recorded on the other track of the audio cassette tape so that Gonzales speech is synchronised with his head and facial movements. Electronic control means 26 sends the appropriate actuating signals to the actuating means 22.

The electronic control means 26 also includes a detecting means for detecting a predetermined point in the video program so that the sound reproducing means and actuating means can be activated in response to said detection. Detecting means of this embodiment includes a set top box 29 which is connected between the video output of a VCR 31 and the video input of a TV set. Set top box 29 includes a low power infra-red transmitter for communicating with the puppet 10. Set top box 29 detects when a video signal is transmitted from the VCR 31 to the TV set after the VCR play button is pressed, and transmits a VIDEO PLAY signal to the puppet 10. Set top box 29 includes a signal separator circuit which separates the vertical frame sync pulses from the video signal. The vertical frame sync pulses are short in duration and not suitable for directly transmitting. Therefore, the sync pulses are modified and multiplied to 250 Hz by feeding the pulses to a phase-locked loop circuit within the set top box 29. The frequency of the 250 Hz signal is sufficiently far removed from the mains 50 or 60 Hz so that electric mains frequency lighting of a viewing room will not interfere with the sensing receiver in the puppet. A 38 kHz infra-red signal is modulated by the 250 Hz modified sync pulse signal to produce the VIDEO PLAY signal, which is similar to the control signals used for TV remote controls and has a similar range.

Detecting means further comprises an infra-red receiver 28 for picking up the VIDEO PLAY signal, and this signal is then used by the electronic control means to activate the sound reproducing means 24 and actuating means 22 of the puppet 10. The VIDEO PLAY signal enables the electronic control means 26 to ensure that the audible responses and movement of the puppet 10 remain synchronised with the soundtrack of the video program. If at any stage the VCR is stopped or paused, the VIDEO PLAY signal will cease and the electronic control means 26 will stop or pause the sound reproducing means 24 and actuating means 22 of the puppet 10. When a VCR is stopped, a length of video tape that is wound into the playback mechanism during playback, is wound back onto the tape spool of the video cassette. Hence, when the VCR is restarted a short time elapses before playback recommences due to the VCR re-spooling time. Electronic control means 26 includes a pre-settable counter which delays the restart time of the sound reproducing means 24 to allow for the VCR re-spool over-run time. The over-run backed up time is allowed to lapse before the audio tape restarts at the point the VCR was originally stopped. This counter can be pre-set via thumbwheel-style switches to obtain the required delay for re-synchronising the audio tape using any make of VCR. Should the audio cassette playback become out of synchronism with the VIDEO PLAY signal, electronic control means 26 will delay or fast forward the audio cassette to bring it back into synchronism.

It will be appreciated that a different audio cassette will need to be inserted in the audio cassette player whenever a different video program is to be viewed. The audio signals are prerecorded on the audio cassette in a particular sequence which is synchronised with the soundtrack and visual information provided in the video program. In Australia, every copy of a particular video program released on video cassette for public purchase or rental has the beginning of the video program commencing at exactly the same point from the beginning of the video cassette tape, even though the recorded pre-program information (such as "new releases") may vary. The beginning point may vary for different video programs. The synchronised operation of the puppet 10 will be described in further detail below.

A battery compartment 32 is provided in the base of the puppet 10 for housing the batteries which supply electrical power to the actuating means 22, sound reproducing means 24 and electronic control means 26 of the puppet.

Figure 2:
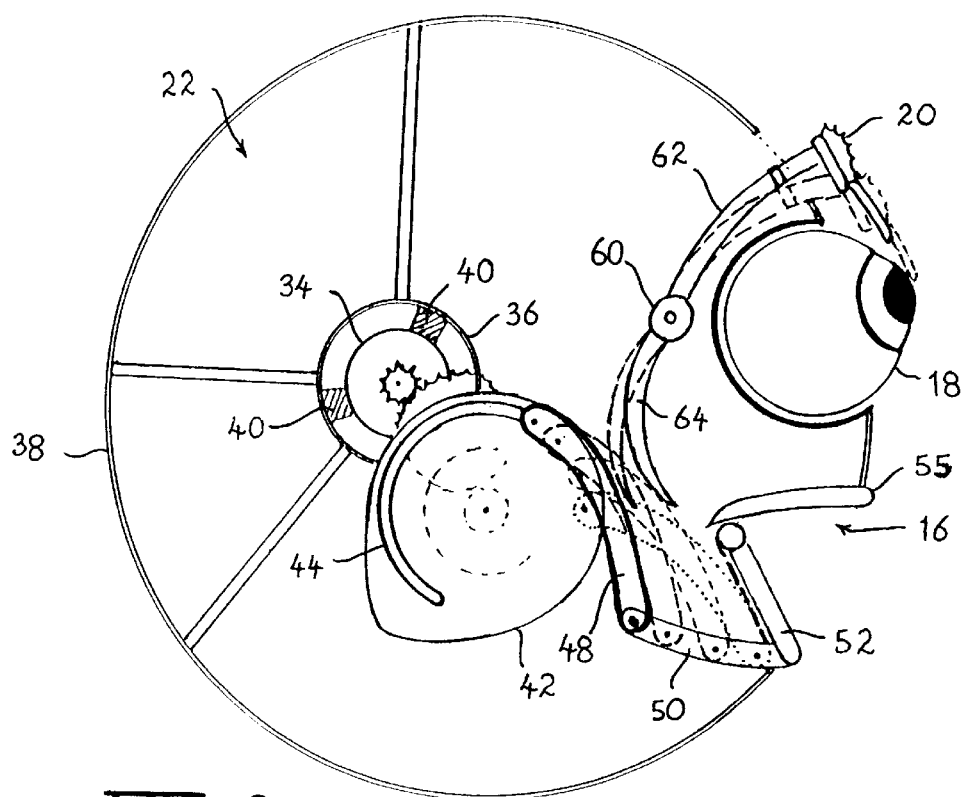
FIGS. 2, 3, and 4 illustrate one embodiment of an actuating mechanism for moving the mouth and eyebrows of the puppet of FIG. 1.
Figure 3:
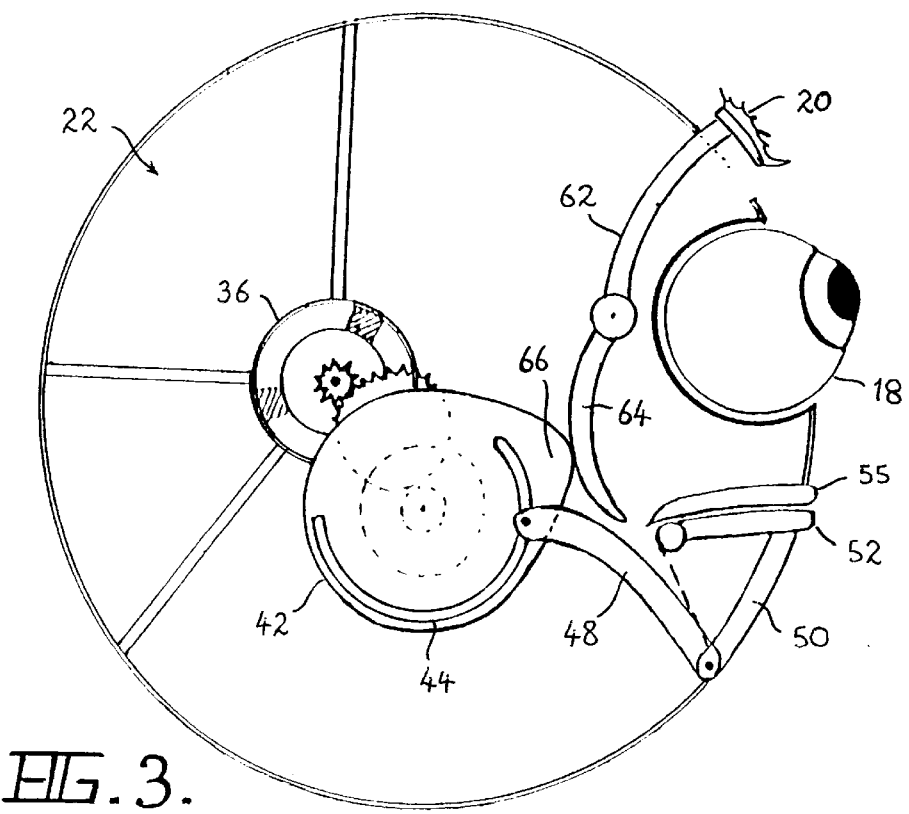
Figure 4:
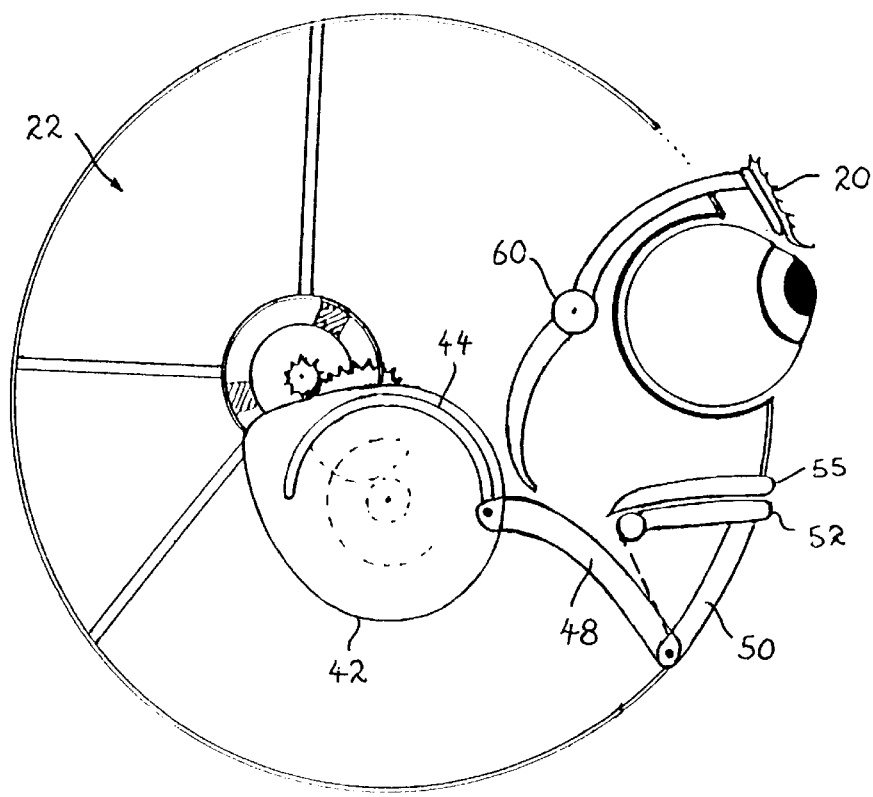

The actuating means 22 includes several actuating mechanisms for actuating the head, mouth, eyes and eyebrows of the puppet 10. FIGS. 2, 3 and 4 illustrate an actuating mechanism for the mouth 16, eyes 18 and eyebrows 20 of the puppet. The actuating mechanism includes a small DC electric motor 34 which is mounted in a motor housing 36 provided within a head casing 38 of the puppet's head 14. The motor 34 is mounted within the housing 36 with a plurality of absorption blocks 40, made from foamed plastics material and designed to absorb the vibration generated by the motor 34 in operation. Hence, operation of the motor 34 is practically silent as the vibrations are not transmitted to the casing 38. Motor 34 drives an elliptic cam member 42 which has a circular slot 44 provided therein.

Figure 8:
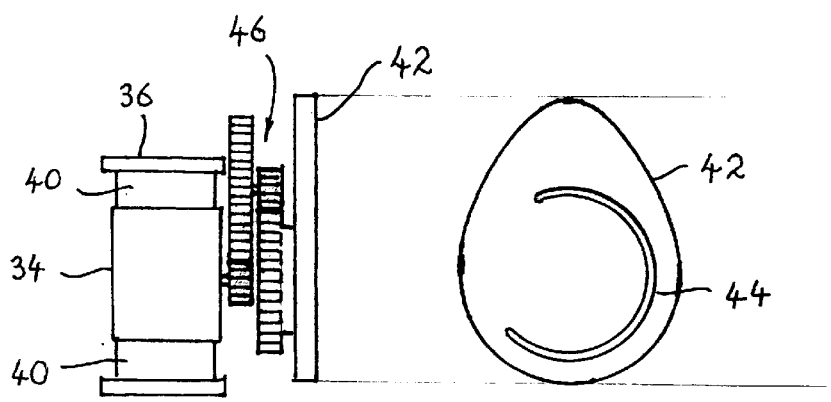
FIG. 8 illustrates a second electric motor and transmission for the puppet of FIG. 1; and, FIGS. 9 and 10 are a perspective view of the actuating mechanism similar to FIG. 6, showing the way in which the eyes of the puppet move.

As can be seen most clearly in FIG. 8, cam member 42 is driven via a transmission 46 consisting of a gear train adapted to convert the rotation of the output shaft of motor 34 to a significantly slower rotational speed of the cam member 42. By changing the polarity of the battery connections to motor 34 the direction of rotation of the output shaft can be reversed, which also reverses the direction of rotation of cam member 42. The electronic control means 26 controls the operation of electric motor 34 in both directions of rotation, as will be described further below.

The slot 44 in cam member 42 is used to control movement of the mouth 16 of the puppet by means of a first linkage arm 48 and a second linkage arm 50 which is pivotally connected to the first linkage arm. As can be seen most clearly in FIG. 6, the first linkage arm 48 includes a pair of links connected by means of a first pivot pin which passes through slot 44 and a second pivot pin which passes through the second linkage arm 50. The second linkage arm 50 is rigidly connected to a lower lip 52 of the puppet's mouth 16. The lower lip 52 curves round and is hinged at each end 54 on the casing 38 so that it can pivot between an open position as shown in FIG. 2 and a closed position as shown in FIGS. 3 and 4. The upper lip 55 of the puppet's mouth 16 remains stationary.

The slot 44 is designed so that when the cam member 42 is driven in an anticlockwise direction (as viewed in FIGS. 2 to 4) it will pull the first linkage arm 48 in such a way that the second linkage arm 50 will cause the lower lip 52 to pivot downwards as shown in FIG. 2. The movement of the first linkage arm 48 during rotation of cam member 42 is shown in broken outline. The first linkage arm 48 is shown in its final position, when the lower lip 52 reaches the fully open position of mouth 16. FIG. 4 illustrates the position of the first linkage arm 48 when the end of slot 44 first engages with the pivot pin and the lower lip 52 is in the closed position. A spring (not shown) is provided which biases the lower lip 52 towards the normally closed position. Hence, when power to the electric motor 34 ceases, cam member 42 will be pulled back in a clockwise direction by the linkage arms 48,50 as the lower lip 52 returns to its closed position. Clearly, if power is again connected to the motor 34 with the same polarity the lower lip 52 will again be drawn downwards to open mouth 16. Hence, by supplying an actuating signal to electric motor 34 in a predetermined sequence of pulses, movement of the lower lip 52 can be controlled so as to give the appearance of speech.

Figure 6:
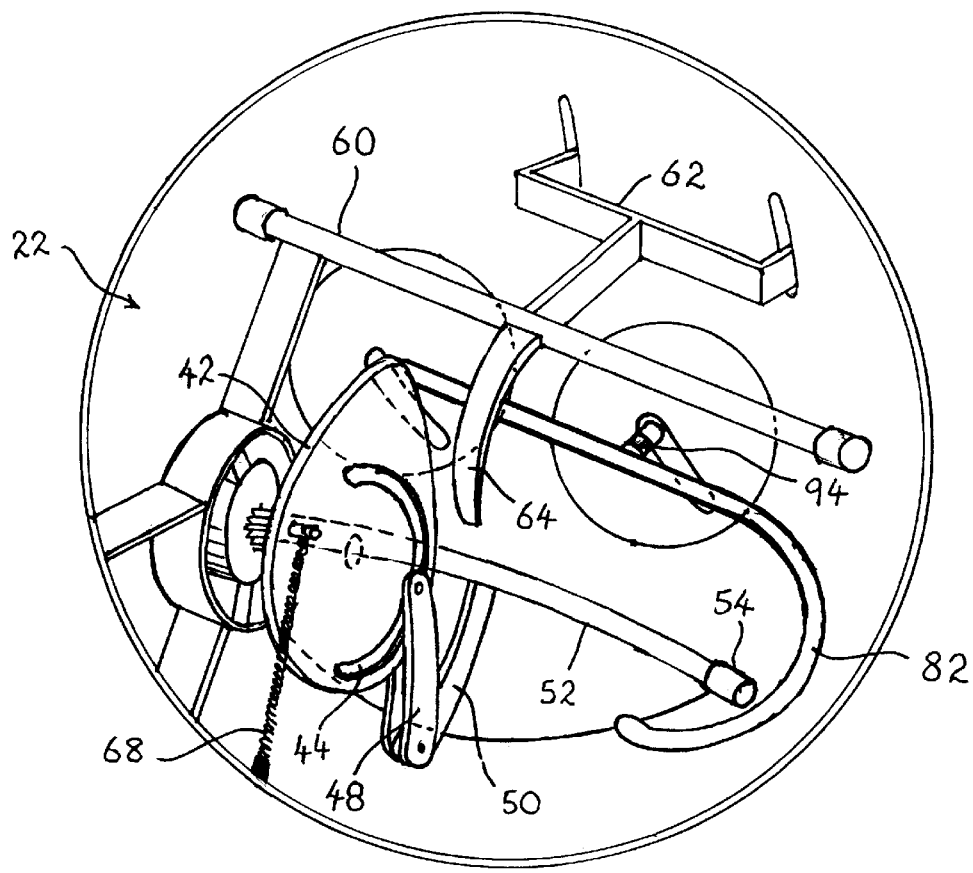
FIG. 6 is a perspective view of the actuating mechanism shown in FIGS. 2, 3 and 4.

Cam member 42 is also used to control movement of the eyebrows 20. As can be seen most clearly in FIG. 6, the eyebrows 20 are mounted on a common pivotable shaft 60 by means of a connecting arm 62. A lever arm 64 connected to the shaft 60 causes the eyebrows 20 to be lifted when a downwards force is applied to the lever arm 64 as shown in FIGS. 2 and 3. A downwards force is applied to the lever arm 64 when the cam member 42 is rotated in a clockwise direction so that an enlarged portion 66 of the cam member engages with the lever arm 64 as shown in FIG. 3. When motor 34 is activated so as to drive the cam member 42 in a clockwise direction, the enlarged portion 66 will eventually engage with the lever arm 64 causing the connecting arm 62 on shaft 60 to pivot upwards. When power to the motor 34 is disconnected a return spring 68 pulls the cam member 42 back in an anticlockwise direction as shown in FIG. 6.

Advantageously, a touch switch (not shown) is provided in connection with the enlarged portion 66 of cam member 42, which automatically disconnects the motor 34 when the cam member 42 reaches the highest position as shown in FIG. 3, in which the eyebrows 20 are moved to their highest lifted position. Return spring 68 will then automatically pull cam member 42 back so that eyebrows 20 drop down to their lowered position. However, as soon as the enlarged portion 66 of cam member 42 moves back the motor 34 is again connected to the electronic control means. Hence, if electric power is still being supplied to the motor 34 the cam member 42 will again rotate in a clockwise direction to cause the eyebrows 20 to again lift. It will be understood that so long as electric power is supplied to the motor 34 the cam member 42 will undergo an oscillating motion between the two positions shown in FIGS. 3 and 6 respectively, causing the eyebrows to flutter up and down in a most disarming fashion.

A second actuating mechanism is provided for moving the head 14 of the puppet as shown in FIGS. 1 and 7. A small electric DC motor 70 is mounted within the body 12 below a neck 72 of the puppet. Motor 70 is also under the control of electronic control means 26. Neck 72 has a gear 74 connected to the bottom thereof which is coupled to the output shaft of motor 70 by means of a transmission 76. Transmission 76 comprises a gear train designed to decrease significantly the speed of rotation of gear 74 relative to the output shaft of motor 70. Clearly, the electric motor 70 and transmission 76 may be arranged to enable rotation of the head 10 in both directions. However, in the present embodiment electronic control means 26 controls the operation of motor 70 in such a way that Gonzales only turns his head sideways in one direction (to the left) and back again facing forward.

Figure 5:
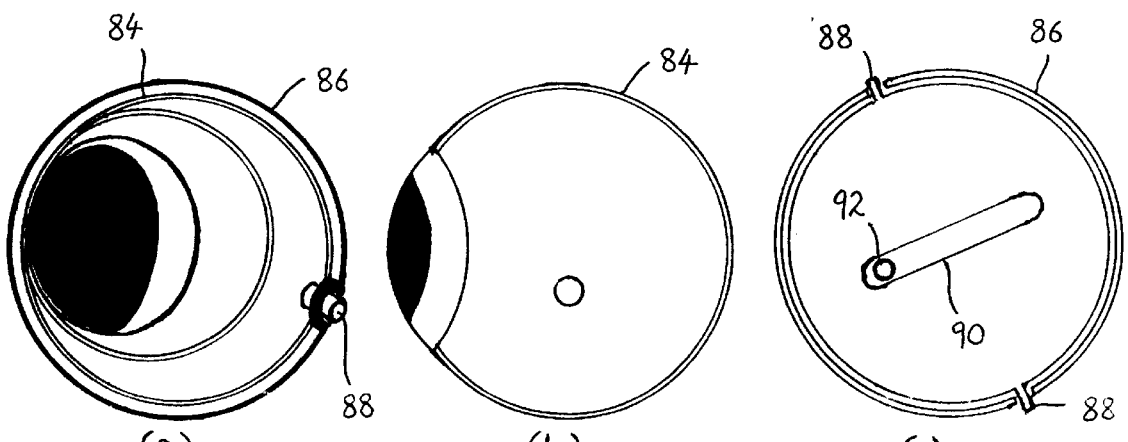
FIGS. 5(a), (b), and (c) illustrate first, second and third views respectively of one embodiment of a moveable eye for the puppet of FIG. 1.
Figure 9:
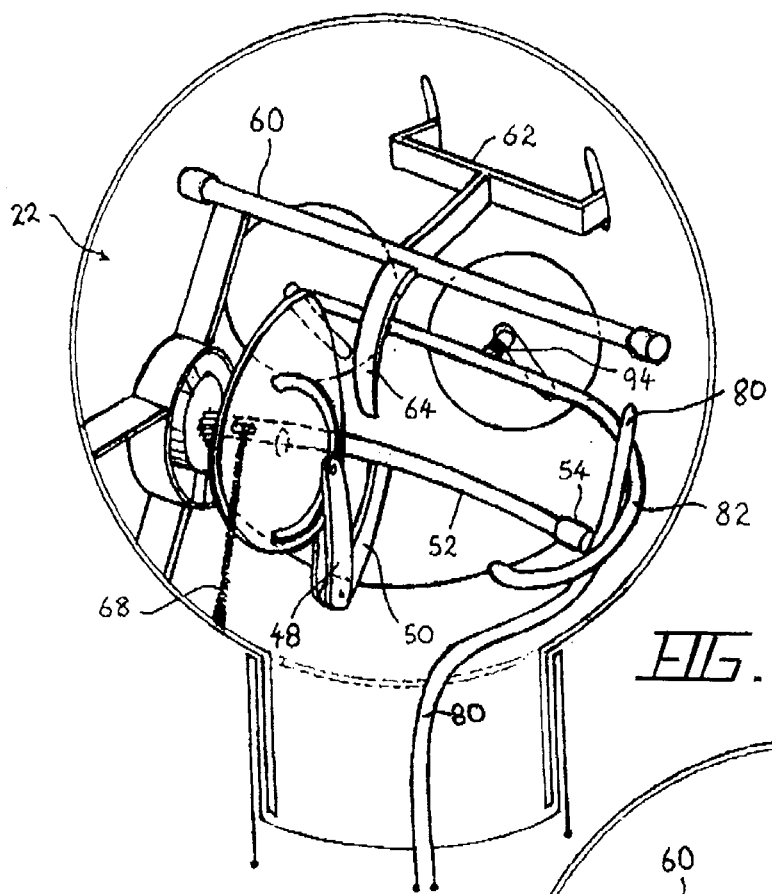
Figure 10:
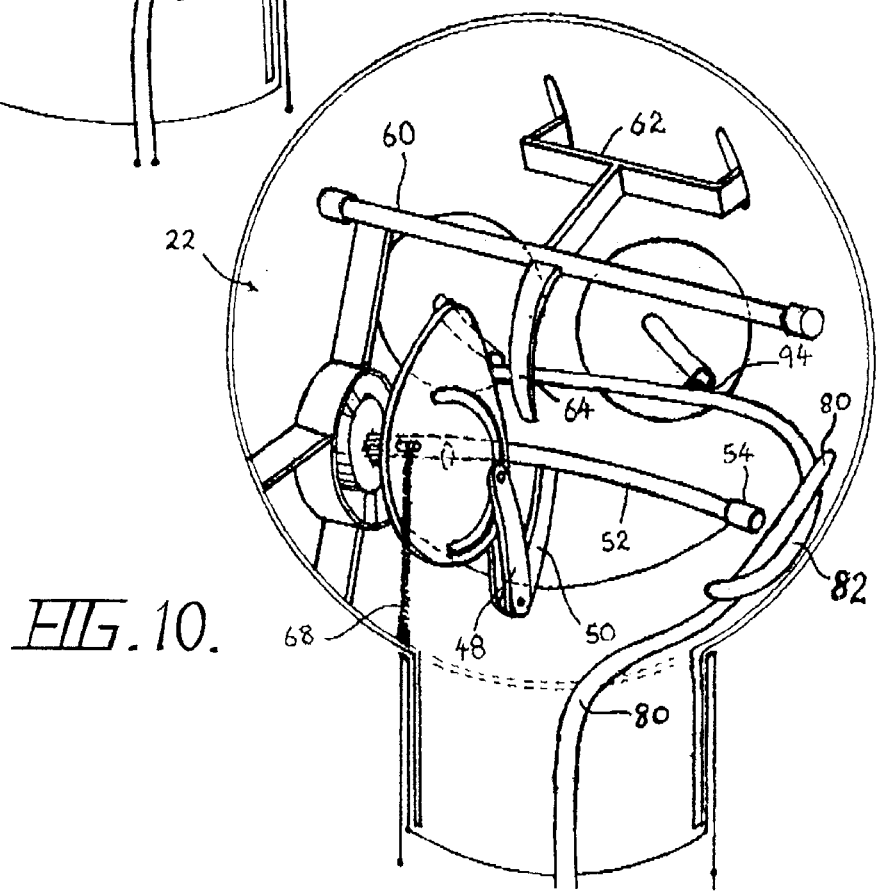

Movement of the eyes 18 is also controlled by the electric motor 70. A control arm 80 passes upwards through the neck 72 and remains stationary relative to the head 14. Control arm 80 is adapted to engage with a hook member 82 (see FIGS. 9 and 10) which is coupled to the rear of the eyes 18. Each eye 18 as shown in FIG. 5 comprises an eyeball 84 which is pivotally mounted within an eye socket 86 on a pivot axis 88. The pivot axis 88 is offset from the vertical as shown in FIG. 5(*c*) so that eyeball 84 pivots within the socket 86 at an angle upwards, rather than horizontally. Therefore, in use when the eyeball 84 pivots within the socket 86 it appears that Gonzales looks upwards and to the left, rather than simply to the left. This is done deliberately, as it is anticipated that in most instances Gonzales will be seated at a lower level than a child or adult seated or standing in front of the video monitor. Furthermore, the instruction manual that comes with the puppet will indicate that Gonzales should be seated in front of the video monitor towards the right of the child or adult viewing the monitor. Hence, in use, Gonzales turns his head and his eyes move upwards towards the child when the corresponding actuating mechanism is activated. A slot 90 is provided at the rear of the eye socket 86, through which a pivot rod 92 protrudes for pivoting the eyeball 84 on axis 88. Each of the pivot rods 92 are coupled to hook member 82 by means of a flexible connection 94 as shown in FIG. 6. The flexible connection 94 may be provided by a short length of flexible rubber tubing. Therefore, when the head 14 of the puppet rotates towards the left, (as shown in FIG. 10), control arm 80 engages with hook member 82 to move the pivot rods 92, which in turn causes the eyeballs 84 to pivot upwards to the left on their pivot axis 88.

A typical operating sequence of Gonzales the puppet will now be described in connection with a video program. The video program may, for example, be an educational video program for children such as that produced by "Sesame Street" recorded on a video cassette. As the VCR begins to play back the video cassette, the set top box 29 transmits a VIDEO PLAY signal to the puppet. Electronic control means 26 responds to the detection of the VIDEO PLAY signal from the set top box and triggers operation of the sound reproducing means 24. The audio cassette player will be activated to commence playback of an audio cassette tape which has been inserted therein, corresponding to the particular Sesame Street video program selected. If the video cassette tape includes pre-program information, such as a Copyright Notice and Warning or advertisements for new releases, Gonzales may express irritation or impatience that the Sesame Street program has not yet commenced, or he may make observations about the new releases as appropriate. These responses are all pre-recorded on the audio cassette based on the known content of the particular Sesame Street video cassette tape. When the opening credits and theme song play on the video monitor, Gonzales may exclaim and turn his head sideways as though to speak to a companion in apparent recognition of the video program. As the video program progresses, Gonzales may interject at appropriate points, and draw the child's attention to particular features of the lesson being given which may otherwise have gone unnoticed by the child. In this manner, Gonzales the puppet increases the child's interest in the program and gives an added dimension of excitement and amusement for the child while watching the video program. It will be apparent that any sequence of verbal and other sounds may be prerecorded on the audio cassette tape together with the appropriate actuating signals for corresponding head, mouth, eye and eyebrow movements. It will also be apparent that the use of Gonzales the puppet is not limited to any particular kind of video program. For example, audio cassette tapes may be produced to be used in conjunction with video publicity programs or advertisements to improve attention and enhance viewer enjoyment. Applications of Gonzales' interactive capabilities are endless and limited only by the imagination of the user.

Now that a preferred embodiment of the electronic interactive puppet has been described in detail, it will be apparent that Gonzales has a number of significant advantages over the prior art electronic puppet, including the following:

(i) he can be used with any conventional video program, and does not require a special video recording;

(ii) he can be used with a conventional video player;

(iii) the audio signals and actuating signals required to control Gonzales can be recorded on a conventional audio cassette tape; and, (iv) no licence fee is payable to the owner of the copyright in the soundtrack of the video program, since Gonzales is provided with his own audio and actuating signals which are independent of the soundtrack of the video program.

Numerous variations and modifications to the described embodiment will suggest themselves to persons skilled in the electronic and related arts, in addition to those already described, without departing from the basic inventive concepts. For example, the puppet may take any suitable form, for example, that of a robot. Furthermore, any number of moving parts may be added simply by the addition of further actuating mechanisms under the control of the electronic control means. All such variations and modifications are to be considered within the scope of the present invention, the nature of which is to be determined from the foregoing description and the appended claims.

The claims defining the invention are as follows:

1. An electronic interactive puppet capable of moving and reproducing sounds that are synchronized with a soundtrack of a conventional video program, the puppet comprising:

a body having at least one moving part associated therewith;

an actuating means provided within said body for moving said at least one part responsive to an actuating signal;

sound reproducing means housed within said body for reproducing pre-recorded sounds, said sound reproducing means including an audio recording medium reproducing means and an audio transducer, said pre-recorded sounds being recorded in a recording track of an audio recording medium inserted for playback in said audio recording medium reproducing means, and said actuating signal being recorded in another track of said audio recording medium; and, an electronic control means operatively connected to said actuating means and sound reproducing means, and including a detecting means for detection of a predetermined point in said video program and for activating said sound reproducing means and actuating means responsive to said detection whereby, in use, the puppet appears to audibly and animatedly interact with the video program.

2. An electronic interactive puppet as defined in claim 1, wherein said audio recording medium is magnetic recording medium.

3. An electronic interactive puppet as defined in claim 2, wherein said magnetic recording medium is an audio cassette tape.

4. An electronic interactive puppet as defined in claim 1, wherein the puppet is in the form of a human-like creature and said body has a head capable of moving.

5. An electronic interactive puppet as defined in claim 4, wherein the head has a moveable mouth and moveable eyes.

6. An electronic interactive puppet as defined in claim 5, wherein said actuating means comprises a first electric motor for turning the puppet's head sideways.

7. An electronic interactive puppet as defined in claim 6, wherein said actuating means further comprises a second electric motor for moving the puppet's mouth open and closed.

8. An electronic interactive puppet as defined in claim 1, wherein said detecting means includes a set top box connected to a video output of an apparatus for reproducing said video program, said set top box including means for detecting a video signal from the video output and means for transmitting a VIDEO PLAY signal to the puppet in response thereto.

9. An electronic interactive puppet as defined in claim 8, wherein said detecting means further comprises a receiver provided in the puppet for receiving said VIDEO PLAY signal, wherein said VIDEO PLAY signal enables the control means to ensure that the audible interaction and movement of the puppet remain synchronised with the soundtrack of the video program.

10. An electronic interactive puppet as defined in claim 9, wherein said VIDEO PLAY signal is derived from a vertical frame sync pulse signal embedded in the video signal.

11. An electronic interactive puppet as defined in claim 9, wherein said means for transmitting the VIDEO PLAY signal is an infra-red transmitter which transmits an infra-red signal modulated by said VIDEO PLAY signal.

* * * * *